United States Patent [19]

Smith

[11] 4,393,034

[45] Jul. 12, 1983

[54] ENERGY EFFICIENT PROCESS FOR THE PRODUCTION OF CARBON BLACK

[75] Inventor: Norman L. Smith, Columbus, Ohio

[73] Assignee: Ashland Oil, Inc., Ashland, Ky.

[21] Appl. No.: 199,173

[22] Filed: Oct. 22, 1980

[51] Int. Cl.³ .......................... C01B 31/02; C09C 1/48
[52] U.S. Cl. .................................................. 423/450
[58] Field of Search ................. 423/449, 450; 422/150

[56] References Cited

U.S. PATENT DOCUMENTS

| | | | |
|---|---|---|---|
| 2,623,811 | 12/1952 | Williams | 23/209.6 |
| 2,672,402 | 3/1954 | Stokes | 423/450 |
| 3,438,732 | 4/1969 | Morel | 423/458 |
| 3,595,618 | 7/1971 | Kiyonaga et al. | 23/209.4 |
| 4,058,590 | 11/1977 | Ruble | 423/449 |
| 4,088,741 | 5/1978 | Takewell | 423/450 |
| 4,206,192 | 6/1980 | Austin | 423/450 |
| 4,237,092 | 12/1980 | Lewis | 423/450 |
| 4,261,964 | 4/1981 | Scott | 423/450 |

FOREIGN PATENT DOCUMENTS

| | | | |
|---|---|---|---|
| 963526 | 7/1964 | United Kingdom | 423/450 |
| 991483 | 5/1965 | United Kingdom | 423/450 |

*Primary Examiner*—O. R. Vertiz
*Assistant Examiner*—Gregory A. Heller
*Attorney, Agent, or Firm*—William Kammerer

[57] ABSTRACT

Method for the production of carbon black by an oil furnace process whereby an aromatic feedstock is pyrolytically dissociated into carbon black by contact with a turbulent mixture of combustion gases generated in burning a gaseous fuel in the presence of a stoichiometrical excess of oxygen. The gaseous fuel feed to the process being recycled off-gases associated with the pyrolysis reaction effluent from which the condensible gas content thereof is removed prior to recycling.

2 Claims, 1 Drawing Figure

ENERGY EFFICIENT PROCESS FOR THE PRODUCTION OF CARBON BLACK

BACKGROUND OF THE INVENTION

1. Field of the Invention

This invention relates to the production of carbon black.

2. Description of the Prior Art

The rubber industry currently accounts for essentially all of the usage of carbon black. In turn, predominantly all of this usage is for the purpose of reinforcing rubber compounds in the fabrication of automobile, truck and off-the-road vehicle tires. Since the carbon black component amounts to 30–35% of the weight of such rubber compounds, the consumption of this commodity is understandably vast.

Carbon black for the manufacture of tires is produced by the so-called oil furnace process. This process as generally practiced today basically involves contacting atomized droplets of an aromatic-rich hydrocarbon feedstock with a turbulent mass of combustion gases resulting from burning a mixture of methane and excess pre-heated air. In accordance with the foregoing process, a major portion of the feedstock is pyrolytically dissociated in a partial oxidation reaction to provide a substantial yield of carbon black in the form of an aerosol whence pulverulent black is recovered, usually by filtration, and thereupon pelletized for the market.

The oil furnace process by its very nature is energy intensive. For example, at the current price of natural gas to the industry about 15% of the cost to produce one pound of a high grade black is attributed to this feed to the process. Since the future portends a substantial increase in the cost of natural gas over and above the other cost factors involved in producing carbon black, an alternate fuel source of more stable pricing prospects is particularly indicated. While normally liquid paraffinic hydrocarbons such as the various grades of fuel oil possibly meet this criterion, their attractiveness as an alternate fuel is more apparent than real. This is so primarily because fuel oils are comparatively difficult to combust in the present context requiring a plurality of atomizing nozzles which are prone to cause coking problems in the high temperature environment involved. Beyond maintenance and downtime problems, the use of fuel oils can also adversely affect quality of the carbon black product.

SUMMARY OF THE INVENTION

In accordance with the present invention a method for carrying out the oil furnace process for the production of carbon black is provided which utilizes the off-gases or flue gas of the process for cyclically fueling the combustion reaction involved. As a starting point in the practice of the invention, a conventional hydrocarbon fuel; e.g., natural gas, the various fuel oils, etc., is combusted in the presence of a stoichiometrical excess of an oxidant gas containing at least about 70% oxygen. A carbon black producing hydrocarbon feedstock is injected into a turbulent mixture of the resultant combustion gases to effect the pyrolytic dissociation thereof. The water quenched carbon black aerosol effluent of the furnace is thereupon filtered to recover the carbon black. Upon attaining steady state operating conditions as aforesaid, a portion of the gaseous filtrate substantially free of condensible gases is recycled to the furnace in lieu of the hydrocarbon fuel. Said gaseous filtrate recycle is introduced at a rate adapted to provide a combustion temperature of about that associated with the burning of said hydrocarbon fuel while concomitantly introducing substantially the same stoichiometrical excess of the oxidant gas as initially utilized in achieving steady state conditions.

BRIEF DESCRIPTION OF THE DRAWING

The accompanying drawing is a flow diagram depicting the mass balance accounting of the feeds utilized in producing a tread grade carbon black in accordance with the present invention and additionally illustrates a like accounting for the feeds to satellite carbon black reactors operated in tandem therewith pursuant to the preferred embodiment.

DESCRIPTION OF THE PREFERRED EMBODIMENTS

Figure 1:
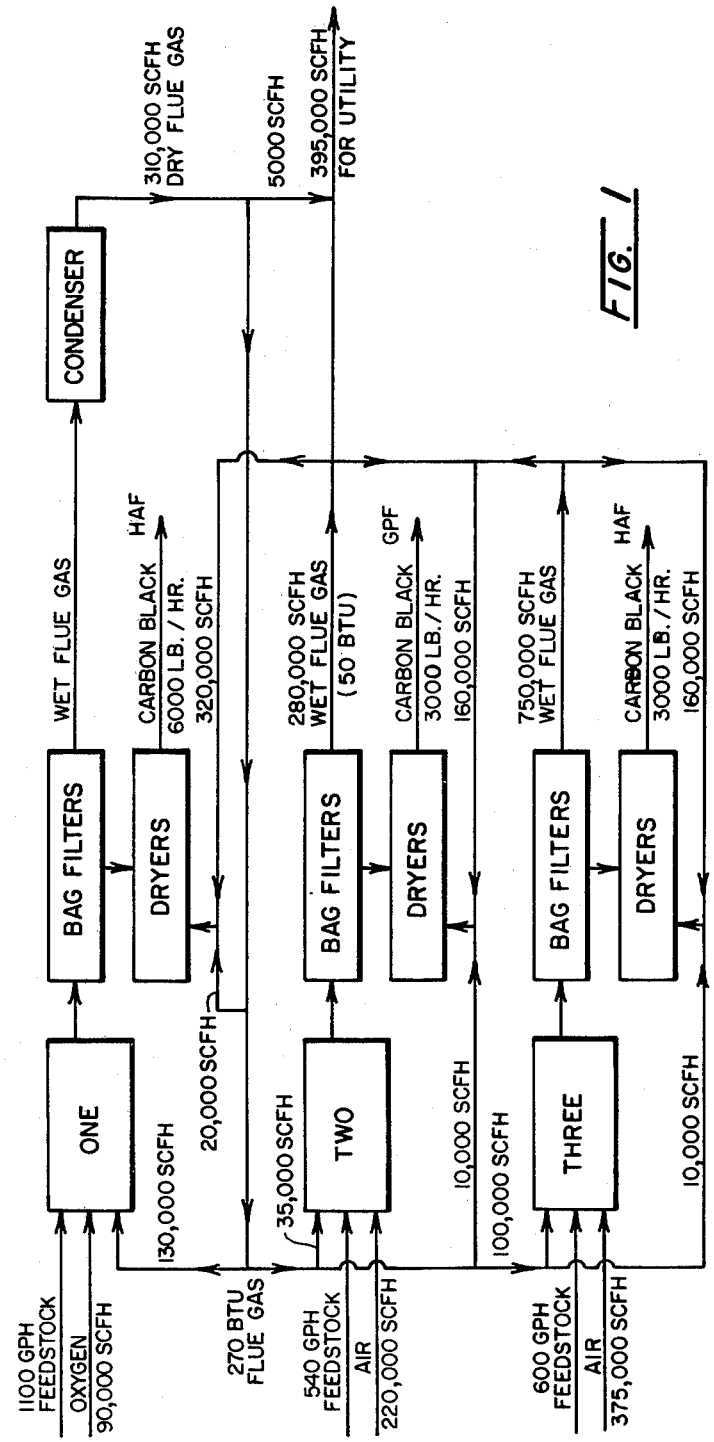

In order to appreciate how the present invention can be implemented most effectively a further discussion of the oil furnace process including an important energy consuming downstream operation is indicated. Two basic grades of carbon black are produced in accordance with the furnace process. One grade, referred to as tread or abrasion-resistant black, accounts for about 60% of the total amount of the overall carbon black production. The other grade is referred to as carcass black and as its name implies is used almost exclusively in the sidewall of the tire structure. Carbon black exists as grape-like clusters or agglomerates of relatively uniform sized black particles. The difference between the two grades primarily resides in the size of the respective agglomerates with the various tread grades being substantially smaller than that of the carcass grades.

As previously indicated the underlying pyrolysis reaction involved in producing carbon black by the oil furnace process, whether the black is tread or carcass grade, is essentially the same. The difference, in the main, depends on the degree of turbulence of the cracking medium and the severity of the pyrolysis reaction. The severe conditions experienced in the production of tread black are such that the resultant reaction time is materially shorter than that encountered in the production of carcass black. Since the net heat loss of the system is directly proportional to the reaction time, the shorter the reaction time the greater the advantage accruing in this context. This is especially so in the contemplated system where the operating temperature is substantially higher than that provided in the use of air as the oxidant gas. Accordingly, the present invention is preferably implemented in the operation of a tread black reactor.

In light of this preference a brief description of the operation of a tread reactor as commercially practiced heretofore will be given. All reactors of this type are generally cylindrical in design and are composed of two principal structural components. The upstream assembly or combustion chamber features a diameter about equal to or substantially greater than its length and openly communicates with a concentrically aligned elongated reaction zone or tunnel having a diameter substantially smaller than that of the combustion chamber.

In operating the reactor, the fuel gas is combusted with a stoichiometrical excess of air in the combustion chamber whereupon the combustion gases are blasted into the reaction zone in a highly turbulent state. In a majority of furnace designs turbulency conditions are augmented by positioning a restrictive flow device at the entrance to the tunnel. Such devices are often modified Venturi designs but also the device can be a simple choke type orifice serving to substantially reduce the diameter of the tunnel. The carbon black producing feedstock is generally injected at about the situs of greatest turbulency which is at or near the upstream end of the tunnel or the flow restrictive device if utilized. A typically representative reactor design of the foregoing type is set forth in U.S. Pat. No. 3,060,003.

There are a number of esoteric process manipulations involved in operating a carbon black furnace which ultimately govern the production of a final product of desired specifications. Suffice it to say, however, that the implementation of the present invention does not call for any significant alteration of these prior art practices. The last process control, again no different herein, is that of quenching the pyrolysis reaction. This is accomplished by introducing a spray of water into the tunnel from a side port, a plurality of which are longitudinally positioned along the length of the tunnel. In this manner the reaction time is regulated to the extent desired.

Following the quenching of the reaction the carbon black aerosol or reactor effluent is filtered, an operation generally carried out by passing the effluent through a battery of bag filters. The pulverulent carbon black recovered from the filtering unit is then pelleted for the trade. Pelleting can be accomplished in accordance with the dry process or the wet process although there is an industry wide preference for the latter method. The wet process consists of mechancially agitating a thick aqueous slurry of the pulverulent black in a suitable apparatus for this purpose. The pelleted carbon black existing in a generally spherical form of about 0.7 mm diameter is then dried. The gaseous filtrate of the filtering operation from which the condensible gas content in a form of steam is removed, is employed to fuel the driers. Because of the low heat value of the indicated gaseous filtrate which in turn is due to its high nitrogen content, the drying operation represents about the only practical use therefor.

In carrying out the present invention in the best mode contemplated, a suitable fuel feed, preferably natural gas, is initially introduced into a tread black reactor. The fuel is combusted in the presence of a stoichiometrical excess of an oxidant gas containing at least 70% and more preferably in excess of about 80% oxygen. Where an on-site oxygen producing facility is available, optimum overall economics are afforded with the production of 90-95% oxygen for use in the process. The excess oxygen applicable in the practice of the invention ranges from 25% to 75% and more preferably from 40-70% above the stoichiometrical requirement for combusting the fuel feed. This excess is maintained after steady state carbon black producing conditions are attained when, as previously pointed out, a portion of the generated off-gases is recycled in lieu of the fuel utilized in the start-up of the process.

Although the use of a rich oxidant gas as contemplated herein gives rise to substantially higher combustion temperatures than that encountered in the use of air as the oxidant gas, the excess oxygen noted above is nonetheless an important operating parameter. This is so because a portion of the carbon black producing feedstock is preferentially combustible and can only be dissociated, if at all, with difficulty. Moreover, combusting a portion of the feedstock represents the most effective way of rapidly bringing the feedstock to the equilibrium cracking temperature. Relying entirely on a more elevated temperature of the cracking medium to achieve this desideratum is at best a compromise because of the heat transfer lag experienced when effecting a reaction having a duration measured in milliseconds.

In the initial operation of a tread black reactor as aforesaid employing natural gas as the fuel feed, the feedstock rate and yield shortly stabilize and with such stabilization, the composition of the off-gases becomes relatively constant. Neglecting the steam and any nitrogen content of the off-gases, the aggregate composition typically consists of about 44% hydrogen, 37% carbon monoxide, 17% carbon dioxide, with the balance being methane and acetylene. At this point after removing substantially all of the steam content, the gases are recycled as the fuel feed at a rate providing a combustion temperature of about that associated with the burning of the natural gas. Likewise, a stoichiometrical excess of the oxidant gas is maintained. Upon equilibration the gases generated in the combustion and pyrolysis reactions essentially correspond in composition to that provided in the use of natural gas as the fuel feed.

The total off-gas stream is somewhat in excess of twice that needed for recycle purposes. Accordingly, in the preferred embodiment of the invention the excess flue gas is combusted with air in the operation of a tandem carbon black reactor or reactors. The tandem reactor(s) can either be a tread or carcass reactor suitably sized or operated in a manner whereby there is a sufficient amount of the flue gas from the primary reactor available for other plant requirements. These other requirements include fuel for the driers and general utility purposes. In the operation of the driers it is preferred to use as the fuel the off-gases of the tandem reactor(s) enriched with the excess flue gas from the primary reactor.

As pointed up throughout the foregoing discussion, the practice of the present invention contemplates operating a carbon black furnace from a processing standpoint in essentially the same manner as accomplished in the prior art. Likewise the design configurations of the prior art furnaces are applicable and any specific design remains a matter of preference. Notwithstanding these compatible aspects, there is a furnace constructional modification called for in carrying out the present invention. All of the prior art furnaces with very few exceptions are metal shells lined with a refractory material for combating the high temperatures inherent in the process. In the use of pure or substantially pure oxygen as the oxidant gas, the temperatures generated are in excess of that which conventional refractory material can withstand. Such temperatures can be coped with readily by fabricating the reactor shell from a heat-resistant steel, dispensing with the refractory lining, and in turn providing means for cooling the surface of the reactor with a heat-conducting medium, preferably water. The obvious disadvantage of this expediency resides in the heat loss encountered. However, in view of the substantial amount of heat required to bring the nitrogen content of air up to reaction temperature when using the latter as the oxidant gas, the heat loss factor noted is on balance relatively small.

EXAMPLE

The invention will be exemplified by illustrating the operation of a reactor designed to produce a tread grade black (HAF) in terms of a mass balance accounting of the feeds to the reactor. The excess flue gas from this primary reactor; i.e., the gas over and above that needed for recycle fuel, is utilized as the fuel feed for two satellite reactors operating in tandem with the primary reactor. One of the satellite reactors is of a conventional design for producing a carcass grade black (GPF). The other satellite reactor is designed and operated to produce the same type of tread black as that produced in the primary reactor. The entire operational system is depicted in the accompanying block diagram drawing.

As can be noted from the drawing the satellite reactors 2 and 3 utilize air as the oxidant gas as opposed to the use of oxygen in the primary reactor 1. The flue gas from the satellite reactors 2 and 3, enriched with the flue gas from the primary reactor serves to fuel the driers associated with the reactors. The rates of the various feeds to the respective reactors are shown in the drawing together with the amount of carbon black product produced by each reactor and the volumetric amounts of flue gas associated therewith. The feedstock in each instance was a heavy aromatic residual oil meeting the industry's specifications for this application.

As previously indicated, the use of pure oxygen as the oxidant gas generates temperatures in excess of that which conventional refractories can withstand over an extended period of operation. While satellite reactors 2 and 3 are refractory lined, the primary reactor 1 consists of an all metal assembly employing external cooling. The structural design of this furnace corresponds to the furnace described in U.S. Pat. No. 3,060,003.

The inside diameter of combustion chamber component of reactor assembly was 19 inches whereas its length was 15 inches. The choke orifice measured 6 inches in diameter and a foot in length. The tunnel or reaction zone comprised two sections, the first or upstream section having an inside diameter of 14 inches and a length of 68 inches. All of the foregoing components of the furnace assembly were provided with an outer shell allowing for a separately confined annular spacing of about ½ inch for each component. In the operation of the furnace, the rate of cooling water in the annular spacing surrounding upstream section of the tunnel was 30 gallons per minute whereas the rates observed for the annular spacings about the choke and combustion chamber components were 40 gallons and 60 gallons per minute, respectively. Connected to the upstream section of the tunnel was a refractory lined section of the same inside diameter, having a length of 12 feet. In the operation of the primary reactor, the pyrolysis reaction was quenched at a point 12 feet downstream from the choke section.

What is claimed is:

1. A method of operating an elongated, generally cylindrical reactor having an upstream and downstream end for the production of carbon black by the furnace process wherein the combustible gases generated a pyrolytically dissociating a carbon black producing feedstock are cyclically utilized as the fuel for effecting the dissociation reaction, which comprises:

introducing a hydrocarbon fuel together with a 25-75% stoichiometrical excess of oxidant gas containing at least 70 volumetric percent oxygen into the upstream end of said reactor and substantially completely burning the fuel to provide a turbulent mixture of combustion gases;

injecting a normally liquid aromatic-rich hydrocarbon feedstock into said turbulent mixture of combustion gases and burning said feedstock to the extent provided by the presence of free oxygen in the combustion gases while essentially simultaneously effecting the pyrolytical dissociation of the unoxidized portion of the feedstock to generate a carbon black aerosol;

quenching the pyrolysis reaction and discharging the aerosol from the downstream end of the reactor whence the carbon black is recovered by filtration;

continuously maintaining the production of carbon black in the manner above defined until steady state conditions are attained; and thereupon recycling a portion of the filtered reactor gaseous effluent substantially free of condensible gases to the reactor in lieu of the hydrocarbon fuel utilized in attaining steady state conditions, said effluent being introduced at a rate adapted to provide a combustion temperature of about that associated with the burning of the initially introduced hydrocarbon fuel while continuing to introduce a 25-75% stoichiometrical excess of the oxidant gas for burning said filtered gaseous effluent.

2. The method in accordance with claim 1 in which the residual portion of said filtered reactor gaseous effluent is introduced as the fuel in at least one other carbon black furnace along with a stoichiometrical excess of air and combusted therein to provide a turbulent mixture of resultant combustion gases into which a normally liquid carbon black producing feedstock is injected for effecting the dissociation thereof.

* * * * *